UNITED STATES PATENT OFFICE.

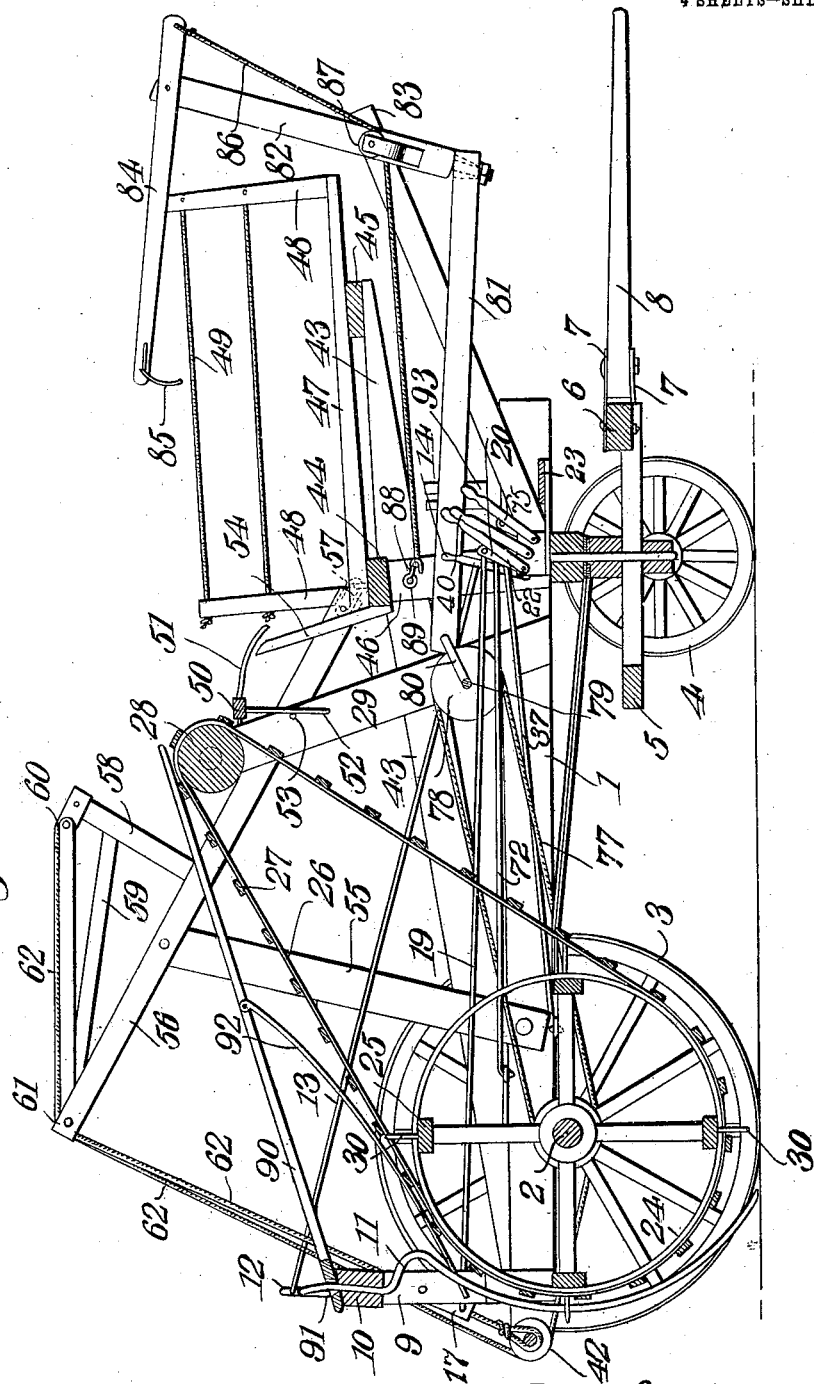

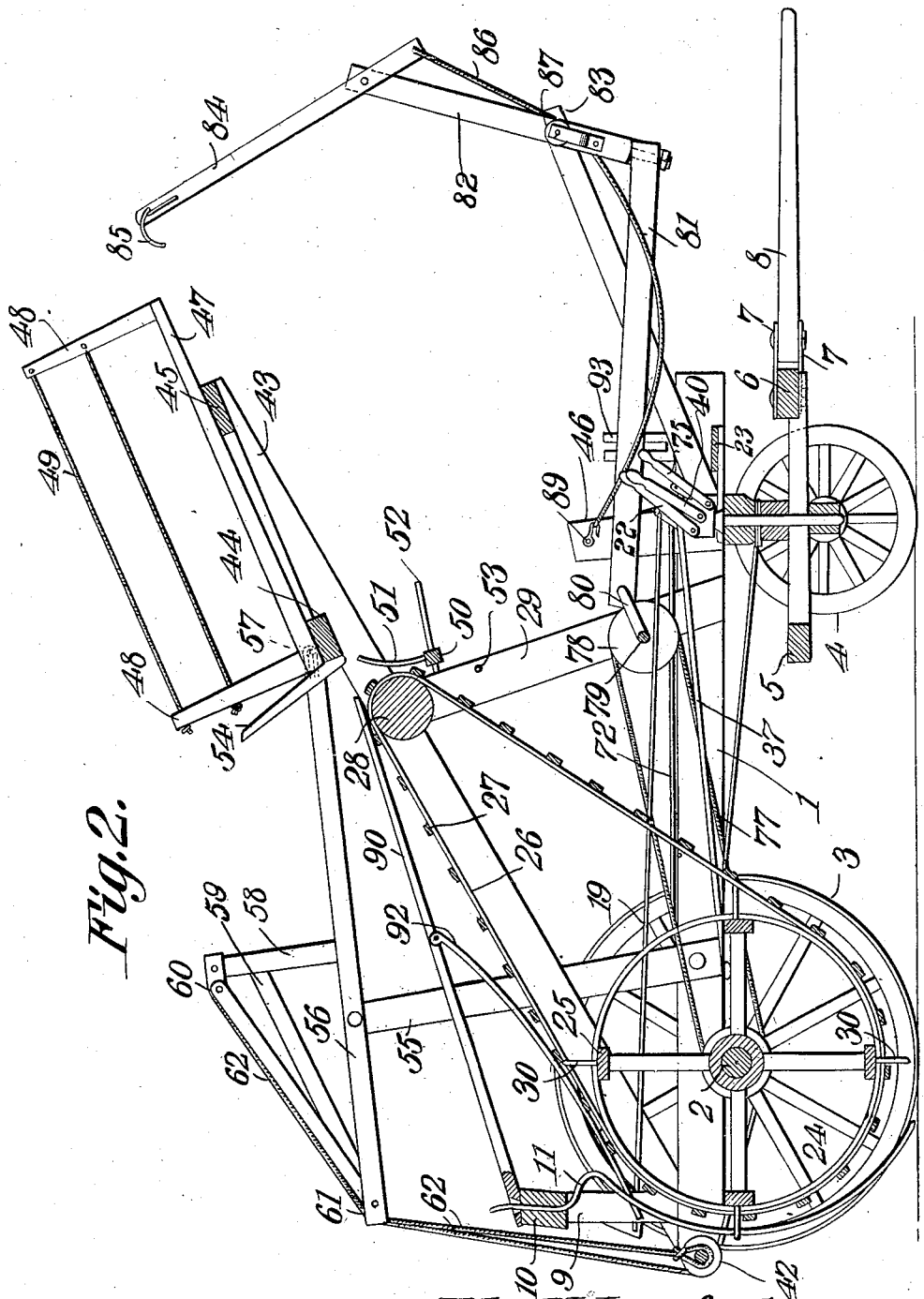

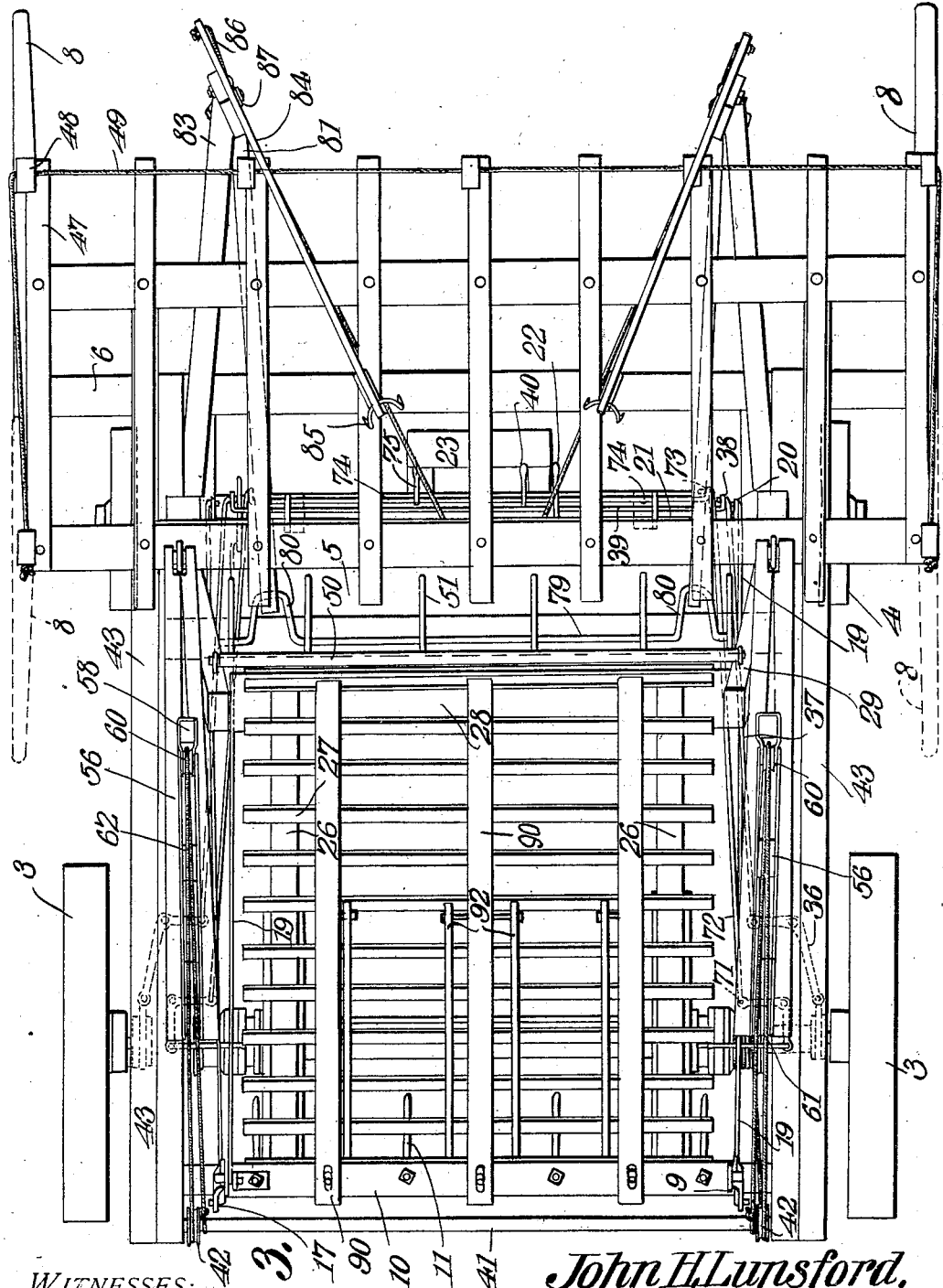

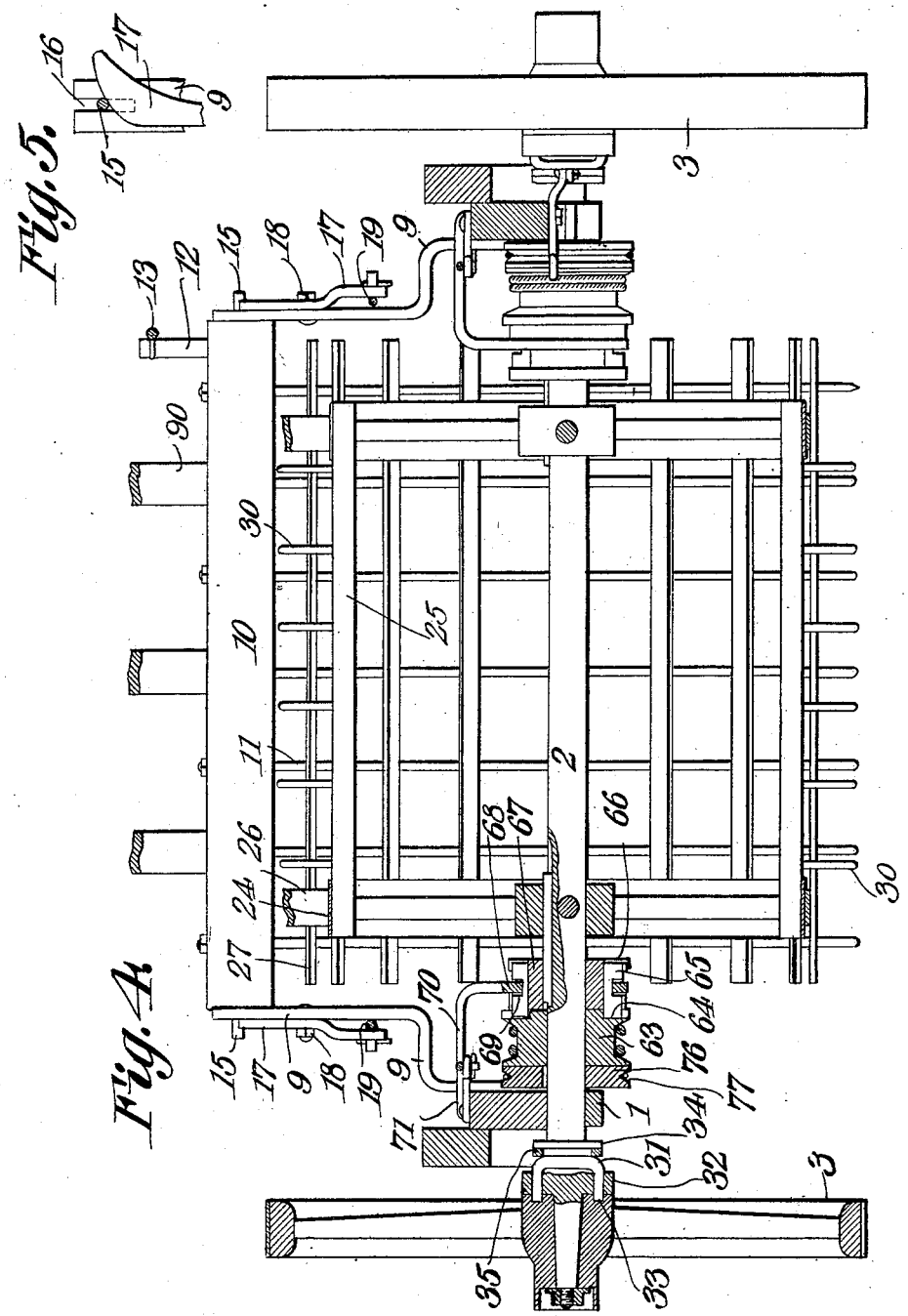

JOHN H. LUNSFORD, OF LAKESIDE, NEBRASKA.

COMBINED HAY STACKER AND RAKE.

No. 861,529.     Specification of Letters Patent.     Patented July 30, 1907.

Application filed July 9, 1906. Serial No. 325,359.

*To all whom it may concern:*

Be it known that I, JOHN H. LUNSFORD, a citizen of the United States, residing at Lakeside, in the county of Sheridan and State of Nebraska, have invented a new and useful Combined Hay Stacker and Rake, of which the following is a specification.

This invention relates to agricultural machines and its object is to provide a combined hay gatherer and stacker adapted to be drawn over a field and to automatically rake hay and feed it to a rack carried by the machine.

Another object is to provide automatic means for spreading the hay upon the rack while it is being discharged thereon.

A still further object is to provide mechanism operated by the movement of the machine for dumping the rack at any desired point.

A further object is to provide a machine of this character which can be drawn backward or forward by the draft animals without unhitching them, thereby permitting the movement of the machine to be quickly reversed to produce a desired operation.

With the above and other objects in view the invention consists of certain novel features of construction and combinations of parts which will be hereinafter more fully described and pointed out in the claims.

In the accompanying drawings is shown the preferred form of the invention.

In said drawings: Figure 1 is a longitudinal section through one side of the machine showing the rack in its normal position; Fig. 2 is a similar view showing the rack partly raised for the purpose of dumping the contents thereof; Fig. 3 is a plan view of the machine and showing by dotted lines the positions assumed by the tongues when the machine is to be drawn rearwardly; Fig. 4 is a transverse section through the rear portion of the machine the clutches and drums at one end of the axle being shown in section; and Fig. 5 is a detail view of the upper portion of one of the rake supporting standards and showing the cam lever in elevation.

Referring to the figures by characters of reference, 1 is a frame supported at the rear by an axle 2 carried by traction wheels 3 and steering wheels 4 are disposed beneath and support the front part of the frame and carry a movable frame 5 having a draw bar 6 secured to the front portion thereof and extending beyond the sides of the frame 1. Links 7 are pivoted upon opposite faces of the draw bar at each end thereof and between each pair of links is pivoted a tongue 8 to which draft animals are adapted to be harnessed in any preferred manner. By mounting the tongues in this manner the same may be swung rearwardly as indicated by dotted lines in Fig. 3 so as to enable the draft animals to pull the machine backward without making it necessary to unharness them. The wheels 3 are loosely mounted on the axle.

Standards 9 are secured to the sides of the frame 1 adjacent the rear end thereof and pivotally mounted between the upper ends of these standards is a cross beam 10 having elongated collecting tines 11 secured therein and extending therefrom, said tines being curved and the free ends thereof supported close to or in contact with the ground. An arm 12 extends upward from the cross beam 10 and is connected by means of a rod 13 with an actuating lever 14 arranged upon the front portion of the frame. The trunnions 15 of the cross beam are movably mounted within slots 16 formed in the standards 9 and bear on the cam ends of levers 17 which are fulcrumed between their ends upon pivots 18 extending from the standards 9. Rods 19 are pivoted to the lower portion of these levers and extend forward and are pivoted to arms 20 extending upward from the ends of a shaft 21 which is journaled upon the front portion of the frame and has an operating lever 22 extending from the central portion thereof and at a point within convenient reach of the driver upon the seat 23.

Keyed or otherwise secured to the rear axle 2 are wheels 24 the peripheries of which are connected by parallel slats 25, said wheels and slats forming a drum about which extends an endless conveyer made up of belts or chains 26 and cross slats 27. This belt extends around a roller 28 journaled between standards 29 disposed between the ends of the frame 1. A series of teeth 30 extend radially from the slats 25 and are adapted to project through that portion of the carriage mounted upon the drum. The wheels 3 of the machine are loosely mounted on the axle 2 so that under ordinary conditions when the machine is moved the axle will not rotate with the wheels.

In order that the wheels 3 may be locked to the axle and cause its rotation a clutch is provided for each wheel. As shown clearly in Fig. 4 each clutch consists of a yoke 31 slidably mounted within a collar 32 on the axle and adapted to be seated within notches 33 in the hub of the wheel 3. A sleeve 34 is slidable with the yoke 31 and is engaged by a ring 35 to which is connected one end of a bell crank lever 36 mounted upon the frame 1. A rod 37 extends from each of these bell crank levers and both of these rods are pivoted to the arms 38 extending upward from a shaft 39 journaled upon the front portion of the frame 1. Said shaft has a lever 40 extending from it adjacent the seat 23 so that the shaft can be conveniently rotated by the driver for the purpose of simultaneously actuating the two clutches to throw the axle into or out of gear with the wheels 3. Obviously unless the axle is in gear with the wheels the endless carrier and the revolving rake teeth 30 will not be operated.

A shaft 41 extends transversely of the frame 1 and is journaled in the rear portion thereof. This shaft carries a pulley 42 adjacent each end and constitutes a pivot for the side beams 43 of a vertically movable frame. Said side beams are connected between their ends by cross beams 44 and 45, one of which, 44, normally rests by gravity upon standards 46 extending upward from the front portion of the frame 1. Secured upon these two cross beams 44 and 45 is a hay rack consisting of a platform 47 and corner standards 48. These standards are connected by heavy wires or rods 49 at the sides and front but the rear of the rack is left open. A cross rod 50 is pivotally mounted upon the standards 29 close to the front end of the carrier and extending from this rod are fingers 51 which normally project over the rear edge of the rack so as to direct on to the rack any material which may be discharged upon the fingers from the carrier. Arms 52 hang downward from the rod 50 and bear against stop pins 53 so as to hold the fingers 51 normally in proper position. Uprights 54 extend upward from the beam 44 so as to prevent the contents of the rack from dumping under ordinary conditions, and these uprights are inclined in relation to the rack so as to permit the contents of the rack to slide thereover after said rack has been raised to a predetermined angle. Standards 55 extend upward from the sides of the frame 1 near the axle 2 and mounted on the upper ends of these standards are walking beams 56 the front ends of which are pivotally connected to the ends of the cross beam 44. This connection is preferably made by means of a link 57. An upwardly extending arm 58 is disposed on each walking beam and has braces 59 connecting the upper portion thereof with the rear portion of said walking beam. This arm 58 carries a pulley 60 at its upper end and another pulley 61 is located at the rear end of the beam 56. A cable 62 is secured at one end to the shaft 41 and extends over the pulley 61 and thence around pulley 60 and again over the pulley 61 to the pulley 42 which is arranged on axle 41. The end of this cable 62 is secured to a drum 63 which is loosely mounted on the axle 2 and has a series of depressions or notches 64 in one face. These notches are adapted to be engaged by keys 65 which are slidably mounted within grooves 66 in a collar 67 keyed to the shaft 2. A ring 68 surrounds this collar and is seated in notches 69 in the keys 65. This ring has an arm 70 extending laterally therefrom and engaged by a bell crank lever 71 which is pivoted upon the frame 1 and is connected by means of a rod 72 with an arm 73 located at the end of a shaft 74 at the front end of the frame 1. It is of course understood that this mechanism is duplicated at the other side of the machine and that the shaft 74 serves to actuate both sets of keys 65 simultaneously for the purpose of throwing the drums 63 into or out of gear with the axle 2. The shaft 74 has a lever 75 extending from it close to the seat 23 so that the driver can readily manipulate the mechanism.

A pulley 76 is keyed to the axle 2 and is adapted to drive a belt 77 which extends around a pulley 78 secured to the shaft 79 journaled in the sides of frame 1. This shaft is provided with a crank 80 near each end and a pitman 81 is mounted on this crank and is pivotally connected at its forward end to a lever 82 fulcrumed upon a forwardly extending arm 83 secured to the sides of the frame 1 and extending therefrom. An arm 84 is fulcrumed upon the upper portion of each of the levers 82 and normally revolves the rack and extends at an angle thereto. Each of these arms has tines 85 extending downward from its rear end and a rope 86 is connected to the forward end of each arm 84 and extends under a pulley 87 and is detachably fastened at its end to a hook 88 secured to a cross rod 89. The arms 84 are disposed at angles to the longitudinal center of the machine so that when they are reciprocated by their actuating mechanism the material dumped upon the central part of the rack will be pulled forward and laterally and will thus be distributed over the rack.

In order that the material upon the conveyer will not become displaced retaining means have been provided consisting of parallel slats 90 which are pivotally connected to the cross beam 10 preferably by forming openings 91 therein through which extends the upper portions of the tines 11. Fingers 92 are pivoted between these slats and rest upon the carrier so as to exert a slight pressure upon the material thereon, said pressure being evenly distributed even though the material is unevenly placed upon the carrier.

When the parts are in their normal positions the machine while being drawn forward will not operate any of the mechanism because the wheels 3 from which the power is obtained are out of gear with the axle 2. When it is desired to set the raking mechanism in motion the clutches 31 are shifted by means of their rods 37 and lever 40 and the axle 2 is therefore caused to rotate with the wheels. As the wheels 24 on which the carrier is mounted rotate with the axle the teeth 30 will be rotated and the carrier will also be set in motion. Said teeth will push the hay on to the tines 11 and pull it upward thereover until it is upon the carrier whereupon the teeth 30 will withdraw through said carrier and the hay will continue upward upon the carrier and beneath the slats 90 and the fingers 92. At the forward end of the carrier the hay will be dropped on to the fingers 51 and will be directed thereby into the rack. The rotation of the axle 2 causes the belt 77 to rotate the crank shaft 79 and therefore the beams 81 will oscillate the levers 82 and cause the arms 84 to swing downward into contact with the material discharged on to the rack. The tines 85 will spread this material over the rack and prevent it from accumulating directly below the discharge portion of the carrier. After a desired quantity of hay has been conveyed to the rack in this manner the mechanism is thrown out of operation by reversing the motion of the clutches 31 and the machine is conveyed to the point where it is desired to stack the hay. The horses are then turned round so as to swing the tongues 8 into positions shown by dotted lines in Fig. 3 and the keys 65 are shifted into engagement with the drums 63 by manipulating the lever 75 so as to rotate shaft 74 and cause the actuation of arms 72 and bell crank levers 71. As soon therefore as the machine is moved backward the cables 62 will be wound on the drums 63 and will pull downward on the rear ends of the walking beams 56. The rack will therefore be swung upward as shown in Fig. 2 throwing the fingers 51 out of the path thereof and as soon as the rack reaches a predetermined inclination the material thereon will slide over the uprights 54 and on to the ground at the point where the stack is to be made. By reversing the movement of the machine the cable 62 will be unwound from the drums 63 and the rack lowered to its initial position. The keys 65 can then be withdrawn from engagement with the drums and the operation hereinbefore described repeated. By manipulating the rods 13 the tines 11 can be swung from or toward the carrier and by means of the rods 19 and their connections the cam levers 17 can be moved so as to raise or lower the cross beam 10 and the tines which are connected thereto. While the rack is being raised it is of course necessary to swing the arms 84 out of the path thereof and in order to do this the operator pulls on the ropes 86 and therefore causes the arms to swing upward as shown in Fig. 2. The fingers 51 are adapted to be maintained in raised position during the dumping operation by gravity because they are thrown past the pivots thereof. The arms 52, however, will be projected into the path of the rack so that when said rack is lowered it will strike the arms and swing the fingers back into their proper position.

In order that the driver may properly handle the reins whether or not the draft animals are being driven forward or backward standards 93 are arranged upon the sides of the frame 1 adjacent the front ends thereof and have slots through which the reins are adapted to work.

What is claimed is:

1. The combination with a wheel supported frame; of a frame adjustably mounted thereon, a rack carried by the adjustable frame, hoisting mechanism for raising the latter frame, mechanism for collecting material and discharging it upon the rack, and independent means for placing said mechanism into or out of operative relation with the wheels.

2. The combination with a wheel supported frame; of an upwardly movable frame carried thereby, a rack upon the movable frame, walking beams supported above and connected to the movable frame, mechanism actuated by the wheels for operating the walking beams to raise the rack and its frame, and means operated by said wheel for collecting material and discharging it upon the rack.

3. The combination with a wheel supported frame; of a rotary rake, collecting devices coöperating therewith, a movable rack, a carrier extending partly around and adapted to be actuated by the rake, rotatable means for directing material from the carrier into the rack, and means operated by the wheels for raising the rack.

4. The combination with a wheel supported frame; of an upwardly movable frame mounted thereon, a rack carried by the latter frame, means operated by the wheels for raising the rack and its frame, means normally extending over the rack for spreading material thereover, and mechanism operated by a supporting wheel for actuating the spreading means.

5. The combination with a wheel supported frame; of an upwardly movable frame mounted thereon, a rack carried by the latter frame, means operated by the wheels for raising the rack and its frame, means normally extending over the rack for spreading material thereover, mechanism operated by a supporting wheel for actuating the spreading means, and means for withdrawing the spreading devices from above the rack to permit upward movement of said rack.

6. The combination with a wheel supported frame; of an upwardly movable frame mounted thereon, a rack carried by the latter frame, means operated by the wheels for raising the rack and its frame, a rotary rake, a carrier extending partly around and operated by the rake, means for directing material from the carrier and on to the rack when said rack is in its lowermost position, and means operated by a supporting wheel for spreading over the rack the material directed thereon.

7. The combination with a wheel supported frame; of a rack, a rotary rake, a carrier extending partly around and operated by said rake, gathering devices coöperating with the rake, slats pivotally mounted upon the gathering devices and loosely bearing upon the uppermost portions of the rake, and retaining devices pivotally mounted between the slats and bearing upon the rake, the ends of said retaining devices projecting between the gathering devices.

8. The combination with a wheel supported frame, a drum rotatable with the supporting wheels, a plurality of teeth radiating from the drum, a conveyer extending partly around and adapted to be actuated by the drum, the teeth on said drum being adapted to extend through the conveyer, gathering devices partly embracing the drum and adjustably mounted in relation thereto, an upwardly movable rack carried by the frame, means operated by the wheels for raising the rack, and means for directing material from the conveyer on to the rack when said rack is in its uppermost position.

9. The combination with a wheel supported frame; of a drum rotatable with the wheels, rake teeth radiating therefrom, a conveyer extending partly around the drum, the teeth on said drum being adapted to extend through the conveyer, a cross beam carried by the frame, elongated tines depending therefrom and partly embracing the drum, said tines constituting gathering means, means for adjusting the cross beam vertically, means for partly rotating the cross beam, a rack for receiving material from the conveyer, and means operated by the movement of one of the wheels for raising the rack.

10. The combination with a wheel supported frame; of a drum rotatable with the wheels, rake teeth radiating therefrom, a conveyer extending partly around the drum, the teeth on said drum being adapted to extend through the conveyer, a cross beam carried by the frame, elongated tines depending therefrom and partly embracing the drum, said tines constituting gathering means, means for adjusting the cross beam vertically, means for partly rotating the cross beam, a rack for receiving material from the conveyer, means operated by the movement of one of the wheels for raising the rack, slats loosely connected to the cross beam and bearing on the uppermost portion of the conveyer, and retaining devices pivotally connected to the slats and bearing on the conveyer, the ends of said devices projecting between the gathering tines.

11. The combination with a wheel supported frame; of a drum rotatable with the wheels, rake teeth radiating therefrom, a conveyer extending partly around and adapted to be actuated by the conveyer, gathering devices for directing material on to the conveyer, means for retaining material upon the conveyer, a rack, means operated by one of the wheels for swinging the rack upward, and a rocking device for directing material from the conveyer on to the rack, said device projecting normally into the path of the rack.

12. The combination with a wheel supported frame; of a drum rotatable with the wheels, rake teeth radiating therefrom, a conveyer extending partly around and adapted to be actuated by the drum, the teeth on the drum being adapted to extend through the conveyer, gathering devices for directing material on to the conveyer, means for retaining material upon the conveyer, a rack, means operated by one of the wheels for swinging the rack upward, and a rocking device for directing material from the conveyer on to the rack, said device projecting normally into the path of the rack, and means operated by one of the supporting wheels for spreading material over the rack.

In testimony that I claim the foregoing as my own, I have hereto affixed my signature in the presence of two witnesses.

JOHN H. LUNSFORD.

Witnesses:
R. A. COOK,
CHAS. H. BURLEIGH.